United States Patent [19]

Kobayashi

[11] Patent Number: 5,568,488
[45] Date of Patent: Oct. 22, 1996

[54] POINTER RE-SETTING METHOD AND APPARATUS THEREOF

[75] Inventor: Takayuki Kobayashi, Tokyo, Japan

[73] Assignee: NEC Corporation, Tokyo, Japan

[21] Appl. No.: 395,098

[22] Filed: Feb. 27, 1995

[30] Foreign Application Priority Data

Jun. 15, 1993 [JP] Japan .................................. 5-143320

[51] Int. Cl.$^6$ ........................................................ H04J 3/06
[52] U.S. Cl. ........................................ 370/105.1; 375/362
[58] Field of Search ............................... 370/105.1, 105.2, 370/105.3, 105.4, 105.5, 105, 100.1, 112, 110.1; 375/354, 355, 359, 360, 362, 366, 368, 365

[56] References Cited

FOREIGN PATENT DOCUMENTS

| 61-177495 | 8/1986 | Japan . |
| 2-27829 | 1/1990 | Japan . |
| 2-272925 | 11/1990 | Japan . |

Primary Examiner—Wellington Chin
Assistant Examiner—Huy D. Vu
Attorney, Agent, or Firm—Sughrue, Mion, Zinn, Macpeak & Seas

[57] ABSTRACT

A pointer re-setting method and apparatus are disclosed wherein resetting in a re-setting process of a pointer which is required for conversion from a transmission line frame phase into an in-apparatus frame phase is performed at an advanced timing to minimize invalid data. The pointer re-setting circuit includes retiming circuit 81 for latching a count value 112 from an in-apparatus frame counter 6 in response to a data head signal 111 from buffer 5, decoder circuit 7 for producing pulse signal 113 indicating a pointer insertion position, retiming circuit 91 for retiming the output from retiming circuit 81 at the timing of pointer insertion position signal 113 when inhibition signal 115 is not outputted from pointer value renewal inhibition signal generation circuit 11, incoincidence detection circuit 10 for outputting incoincidence signal 118 when the output values of the two retiming circuits 81 and 91 do not coincide with each other, retiming circuit 13 for latching incoincidence signal 118 from the incoincidence detection circuit 10 in response to the pointer insertion position signal 113, and pointer value renewal inhibition signal generation circuit 11 for producing a signal to inhibit renewal of the pointer value in response to pointer insertion position signal when incoincidence signal 118 is generated from the incoincidence detection circuit 10.

2 Claims, 7 Drawing Sheets

POINTER RE-SETTING METHOD AND APPARATUS THEREOF

BACKGROUND OF THE INVENTION

1. Field of the Invention

This invention relates to a synchronous multiplexing system wherein the place of the head of a data signal to be multiplexed with a frame is indicated by a pointer (numeric value), and more particularly to a pointer re-setting method and apparatus thereof when converting a transmission line frame into an in-apparatus frame.

2. Description of the Related Art

FIG. 1 is a block diagram showing an example of a conventional pointer re-setting apparatus, and FIG. 2 is a timing chart illustrating operation of the pointer re-setting circuit shown in FIG. 1.

Frame counter 1 counts the contents of the received frame on the transmission line side according to input frame pulse signal (frame synchronizing signal) 102 and clock signal 103 and outputs frame count values 106.

In response to frame count values 106 of the input frame counter, decoder circuit 2 outputs pulse signal 107 indicating the position of a pointer in input data signal 101 (here, count value n 30 1). Retiming circuit 3 retimes (determines and sets a point of time at which a pulse is present) input data signal 101 with pulse signal 107 from decoder circuit 2 to produce pointer value 108, and signal 109 is produced from calculation circuit 4 calculating frame count values 106 with pointer value 108. Signal 109 represents the head place of the data in data signal 101.

Data signal 101 and date head position signal 109 are written into temporary storage circuit 5 with clock signal 103 of the transmission line and then read out from buffer 5 with in-apparatus clock 105.

Second frame counter 6 counts in-apparatus side frames in response to in-apparatus frame pulse signal (in-apparatus frame synchronising signal) 104 and in-apparatus clock 105 inputted thereto and outputs frame count values 112. Further, second decoder circuit 7 produces and outputs pulse signal 113 indicating the place in which the pointer is inserted in the in-apparatus frame.

Retiming circuit 8 latches the frame count value of second frame counter 6 in response to head data indication signal 111 read out from buffer 5 and outputs in-apparatus pointer value 123 from count value 112 of in-apparatus side frames. Pointer value insertion circuit 12 to which the pointer value is inputted multiplexes the pointer value with read out data signal 110 from buffer 5 and outputs a resulted signal as output 126.

Meanwhile, a protection circuit is provided for renewing the in-apparatus pointer, and when the pointer value is renewed, the pointer value must not be changed for succeeding three frames. To this end, pointer value 124 of the last frame is held in timing circuit 9, and when non-coincidence is detected by incoincidence detection circuit 10, incoincidence detection signal 125 is outputted from incoincidence detection circuit 10. In response to incoincidence detection signal 125, pointer value renewal inhibition signal generation circuit 11 generates signal 121 for inhibiting renewal of the pointer value in order to stop renewal of the pointer value.

In the conventional pointer re-setting circuit described above, since the pointer is renewed in response to a data head-indication signal produced on the transmission line side, when the pointer value of the receive data signal of the transmission line varies for each four frames, renewal of the in-apparatus side pointer value is sometimes delayed. This state is illustrated in FIG. 3. In the example thus illustrated, an actual operation of the pointer in the transmission line to vary from a to b and then to c. Here, a', b' and c' denote in-apparatus pointer values corresponding to pointers a, b and c of the transmission line. When data head indication signal 111 is not generated between two positions of the in-apparatus pointer as indicated by A in FIG. 3, renewal of the in-apparatus pointer is delayed (as seen from B in FIG. 3, the in-apparatus pointer is renewed to c' when signal 121 next varies to the L level).

In this manner, in the conventional pointer resetting apparatus, also the inside of the apparatus operates in response to the phase of a frame of the transmission line. Accordingly, the conventional pointer re-setting circuit has a problem in that the pointer value after re-setting may not possibly be renewed immediately.

SUMMARY OF THE INVENTION

It is an object of the present invention to provide a pointer re-setting method and apparatus wherein a pointer value to be re-set when a frame is relayed from a transmission line frame into an in-apparatus frame immediately by using, in comparison between new and old pointer values upon re-setting, a retiming signal of the old pointer as an in-apparatus pointer position indication signal and, therefore, invalid data signals can be reduced as much.

According to an aspect of the present invention, there is provided a pointer re-setting method wherein frames of an inputted time division multiplexed digital signal are temporarily stored into a buffer and then read out in response to an in-apparatus clock signal and the pointer of each of the frames is re-set, comprising:

the first counting step of inputting a frame synchronizing signal 102 indicating the frame head of an inputted transmission line data signal 101 and a clock signal 103 to count data within the frames and outputting count values 106;

the first decoding step of outputting, from the frame count values 106, a pointer position signal 107 indicating the position of the pointer in the transmission line data signal 101;

the first retiming step of retiming the input data signal 101 with the pointer position signal 107 and outputting a pointer value 108;

the calculating step of inputting the frame count values 106 of the input frame and the pointer value 108 outputted as a result of the retiming and outputting data head signal 109 indicating the data head position;

the buffering step of temporarily storing the data head signal 109 and the input data signal 101 at the timing of a transmission line clock 103 and reading out the stored data head signal as the same 111 and input data signal as the same 110 at the timing of the in-apparatus clock signal 105;

the second frame counting step of counting data within an in-apparatus frame by inputting the frame synchronizing signal 104 indicating the frame head of the in-apparatus frame and the in-apparatus clock signal 105 and outputting count values 112;

the second retiming step of latching the frame count values 112 of in-apparatus frames in response to data head signal 111 and outputting the in-apparatus pointer value 114;

the second decoding step of outputting pointer insertion position signal 113 representing the pointer insertion position in the in-apparatus input frame;

the third retiming step of outputting in-apparatus pointer value 117 by retiming the latched pointer value 114 of the in-apparatus frame at the timing of pointer insertion position signal 113 which indicates the insertion position so far as a pointer value renewal inhibition condition is not set particularly;

the step of outputting an incoincidence pulse signal 118 when the in-apparatus pointer value 114 and 117 do not coincide with each other;

the step of outputting inhibition signal 115 in response to pointer insertion position signal 113 to inhibit renewal of the pointer value for the period of three frames when the incoincidence signal 118 is inputted;

the fourth retiming step of latching the incoincidence signal 118 in response pointer insertion position signal 113 indicating the insertion position of the in-apparatus frame by the second decoding step and outputting inhibition signal 119 to inhibit resetting of the pointer; and the pointer inserting step of inserting in-apparatus frame pointer value 117 into in-apparatus input data signal 110 at the timing of pointer insertion position signal 113.

According to another aspect of the present invention, there is provided a pointer re-setting apparatus wherein frames of an inputted time division multiplexed digital signal are temporarily stored into a buffer and then read out in response to an in-apparatus clock signal and the pointer of each of the frames is re-set, comprising:

a first frame counter for counting data within the input frame by inputting a frame synchronizing signal 102 indicating a frame head of an inputted transmission line data signal 101 and a clock signal 103 of the transmission line and outputting frame count values 106;

a first decoder circuit for outputting pointer position signal 107 indicating a pointer position in the transmission line data signal from the frame count values 106;

a first retiming circuit for retiming the input data signal 101 with pointer positions signal 107 and outputting a pointer value 108;

a calculation circuit for outputting data head signal 109 indicating the place of the data head from the frame count values 106 and pointer value 108;

a buffer into which the input data signal 101 and data head signal 109 indicating the data head position are written at the timing of the transmission line clock signal 103 and from which the stored input data signal 101 and data head signal 109 are read out at the timing of the in-apparatus clock signal 105 as input data signal 110 and data head signal 111 respectively;

a second frame counter for counting data within an in-apparatus frame by inputting the frame synchronizing signal 104 indicating the frame head of the in-apparatus frame and in-apparatus clock signal 105 and outputting a count values 112;

a second decoder circuit for producing a pointing insertion position signal 113 which indicates the pointer insertion position in the in-apparatus input frame;

a second retiming circuit for latching the pointer value 112 in response to data head signal 111 and outputting in-apparatus pointer value 114;

a third retiming circuit for retiming in-apparatus pointer value 114 at the timing of the pointer insertion position signal 113 which indicates the pointer insertion position when a pointer value renewal inhibition signal is not set particularly;

an incoincidence detection circuit for outputting an incoincidence pulse when pointer values 114 and 117 which are the output values of the second and third retiming circuits do not coincide with each other;

a pointer value renewal inhibition signal generation circuit for outputting a signal to inhibit renewal of the pointer value for the period of three frames at the timing of said pointer insertion position signal 113 when the incoincidence detection signal is generated from the incoincidence detection circuit;

a fourth retiming circuit for latching the incoincidence detection signal 118 from the incoincidence detection circuit in response to pointer insertion position signal 113; and a pointer insertion circuit for inserting, when a renewal inhibition signal 119 is not received from the fourth retiming circuit, the output value 117 from the third retiming circuit as a pointer to the in-apparatus frame into the data signal 110 inputted from the buffer with the timing of the output signal 113.

DESCRIPTION OF THE PREFERRED EMBODIMENT

Figure 6A:
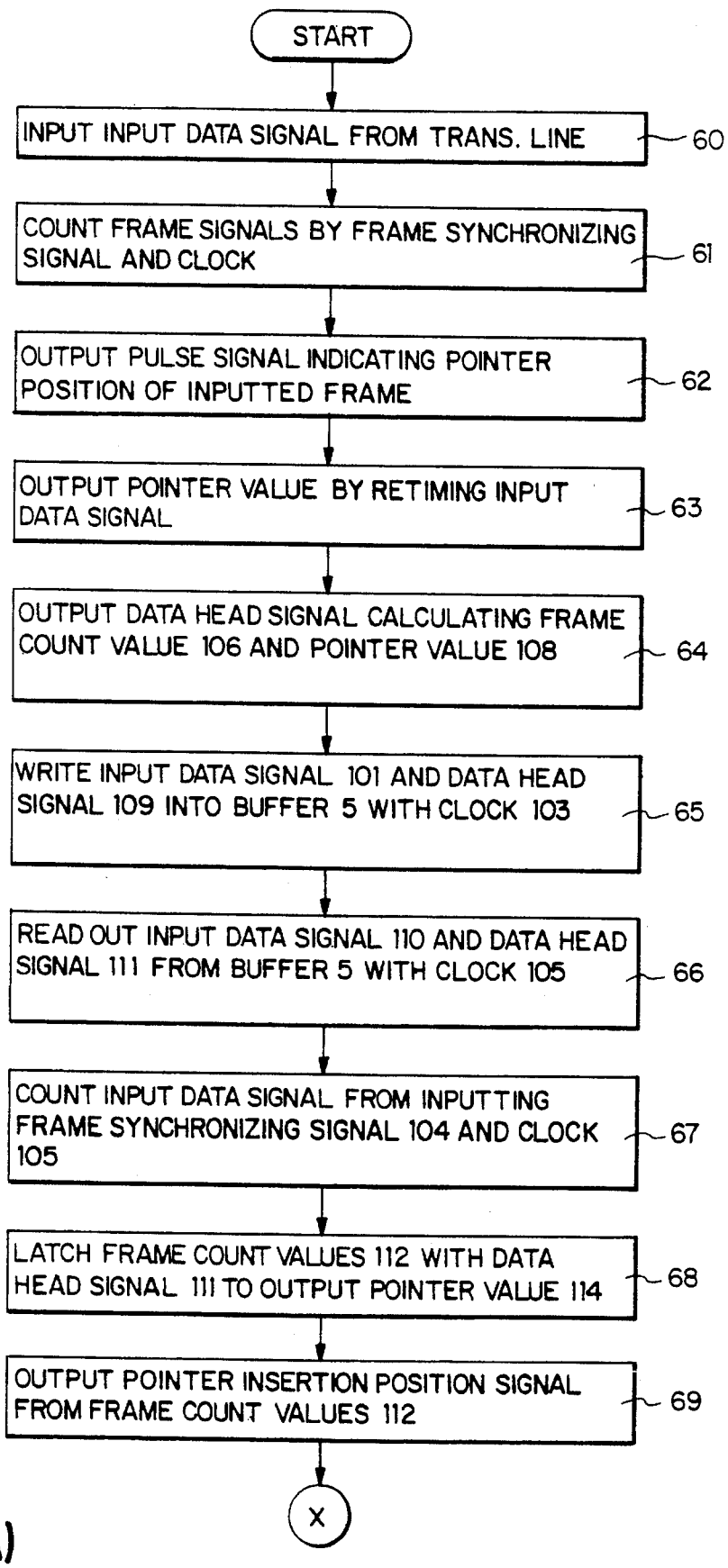
FIGS. 6(A) and 6(B) are flow charts of an embodiment of a pointer re-setting method of the present invention.
Figure 6B:
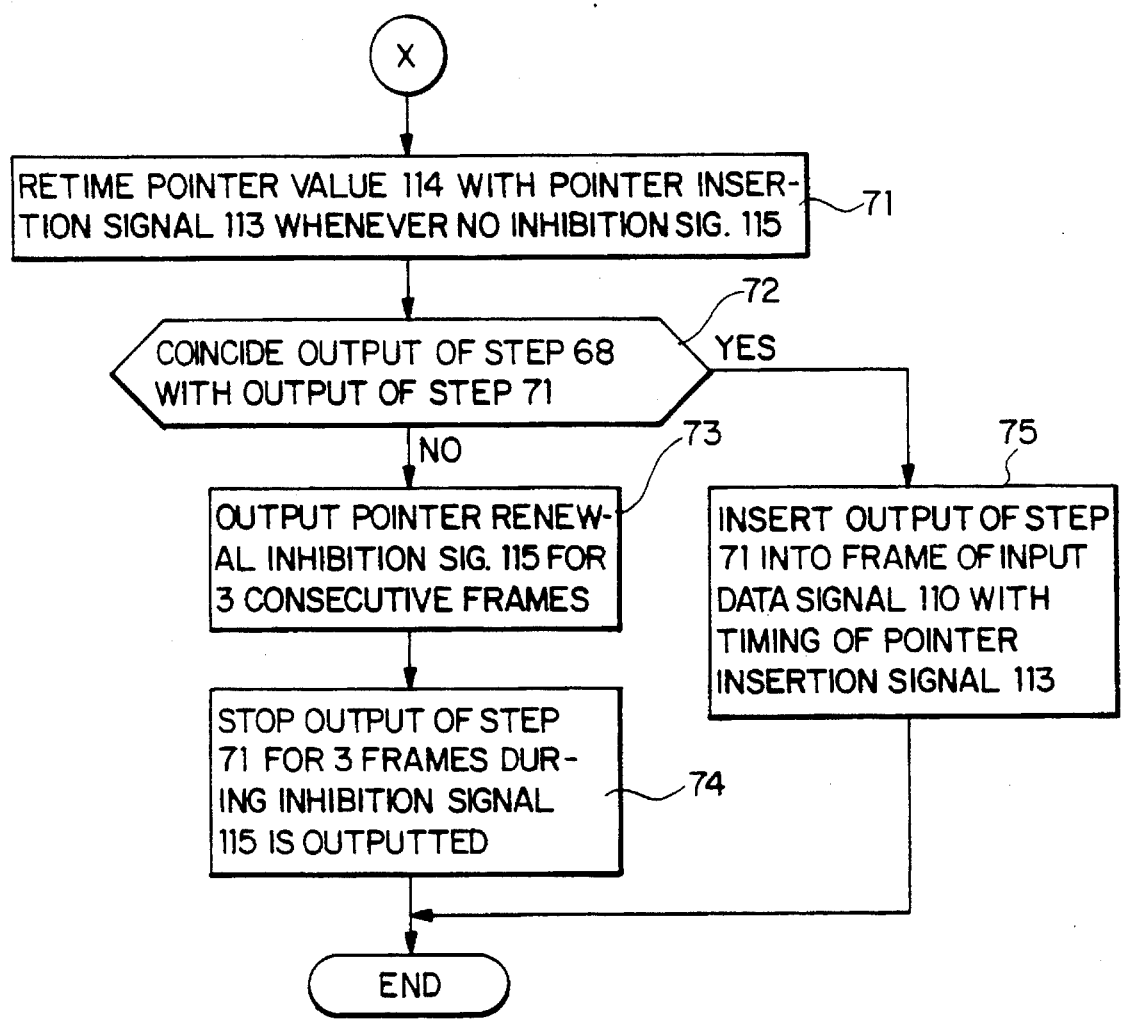

FIGS. 6(A) and 6(B) are flow charts of an embodiment of a pointer re-setting method of the present invention.

A pointer re-setting method, according to the present invention starts from inputting input data signal 101 from the transmission line (step 60).

The present pointer re-setting method for frame relaying comprises the following steps: the first counting step of data within the input frame by inputting frame synchronizing signal 102 indicating the frame head of the input data signal 101 and clock signal 103, and outputting frame count values 106 (step 61), the first decoding step of outputting, from frame count value 106, pointer position signal 107 indicating the position of a pointer input data signal 101 (step 62), the first retiming step of retiming input data signal 101 with pointer position signal 107 and outputting pointer value 108 within a frame of input data signal 101 (step 63), the calculating step of calculating frame count values 106 of the input frame and pointer value 108 and outputting data head signal 109 indicating the data head position of frame in input data signal 101 (step 64), the buffering step of storing data head signal 109 and input data signal 101 at the timing of transmission line clock signal 103 (step 65) and reading out the stored input data signal and data head signal at the timing of in-apparatus clock signal 105 as input data signal 110 and input data head signal 111 (step 66), the second frame counting step of counting data within in-apparatus frame by inputting frame synchronizing signal 104 indicating the head of an in-apparatus frame and in-apparatus clock signal 105 and outputting frame count values 112 (step 67), the second retiming step of latching frame count values 112 of in-apparatus frames in response to data head signal 111 and outputting in-apparatus pointer value 114 (step 68), the second decoding step of outputting pointer insertion position signal 113 representing the pointer insertion position in the in-apparatus frame (step 69), the third retiming step of outputting in-apparatus pointer value 117 by retiming pointer value 114 of the in-apparatus frame at the timing of pointer insertion position signal 113 so far as a pointer value renewal inhibition condition is not set particularly (step 71), the step of outputting incoincidence pulse signal 118 when in-apparatus pointer value 114, outputted as a result of the second retiming step, and retimed in-apparatus pointer value 117 do not coincide with each other (step 72), and the step of outputting inhibition signal 115 in response to pointer insertion position signal 113 to inhibit renewal of the pointer value for the period of three frames when incoincidence signal 118 is inputted (step 73).

The pointer re-setting method for frame relaying further comprises the fourth retiming step of latching incoincidence signal 118 in response to the pointer insertion position signal 113 and outputting inhibition signal 119 to inhibit re-setting of the pointer (step 74), and the pointer inserting step of inserting, when inhibition signal 119 is not outputted, pointer value 117 into input data signal 110 at the timing of pointer insertion position signal 113(step 75).

Figure 1:
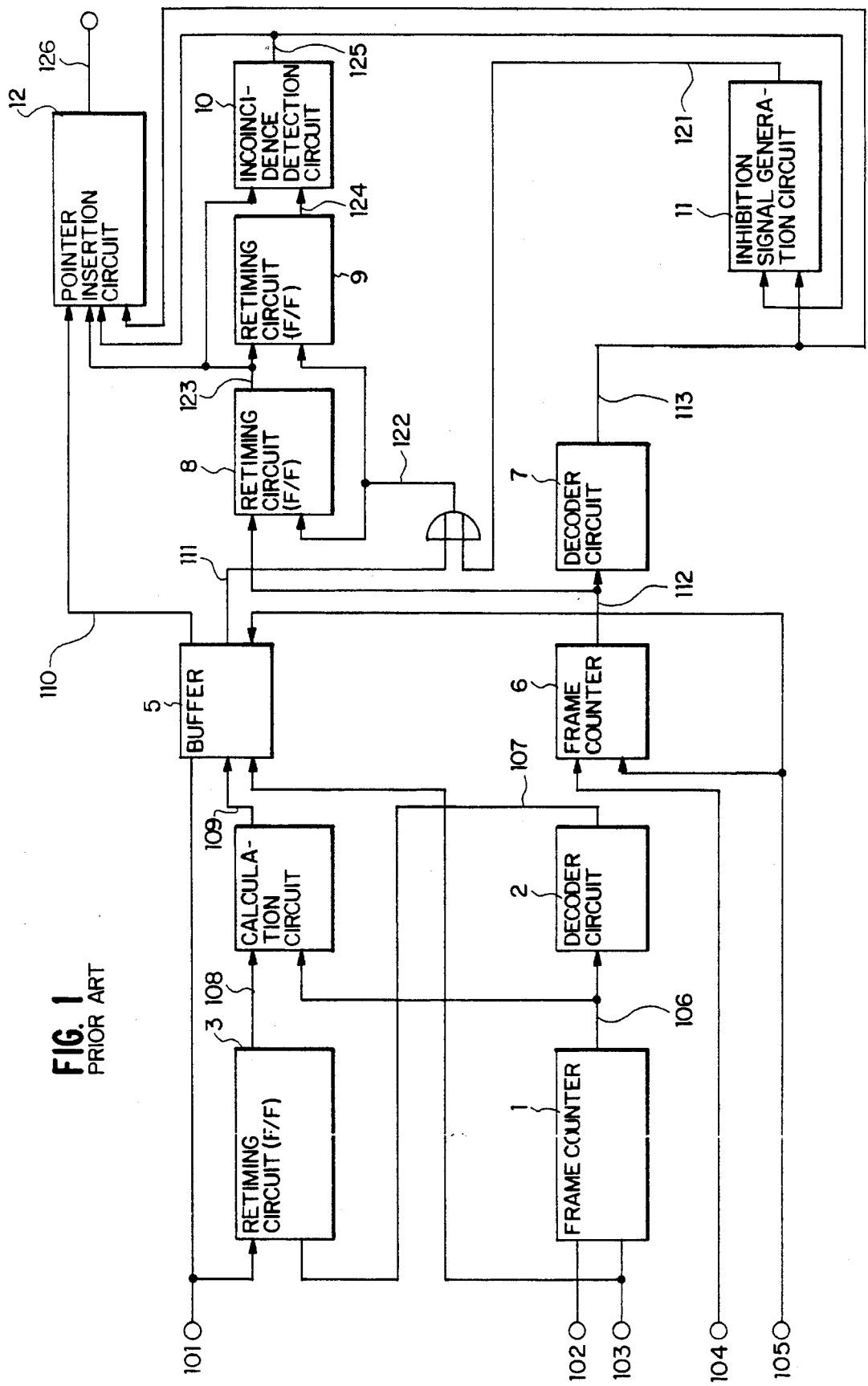
FIG. 1 is a block diagram of a conventional example of a pointer re-setting apparatus.
Figure 2:
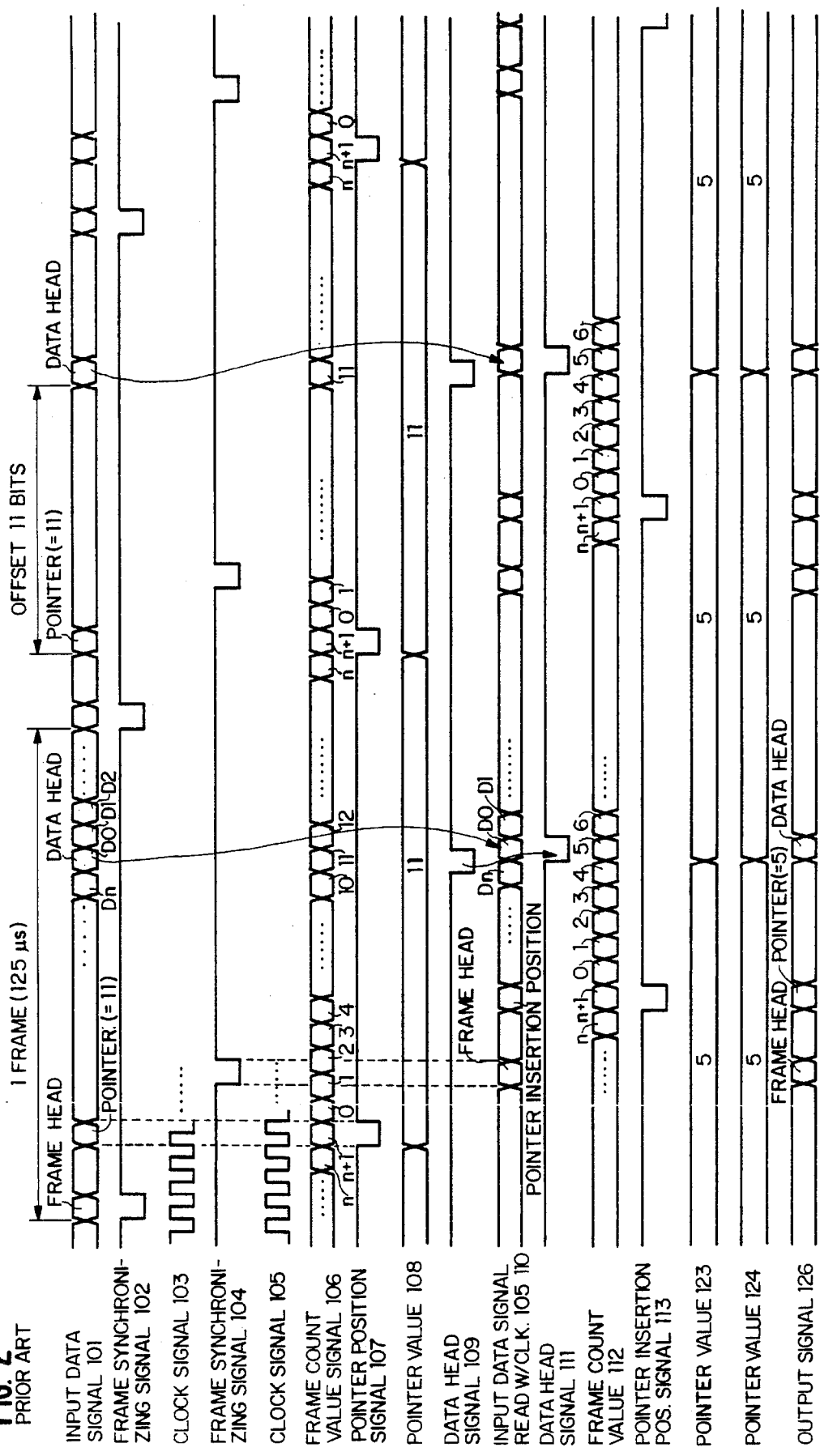
FIG. 2 is a timing chart illustrating operation of the conventional pointer re-setting circuit shown in FIG. 1.
Figure 3:
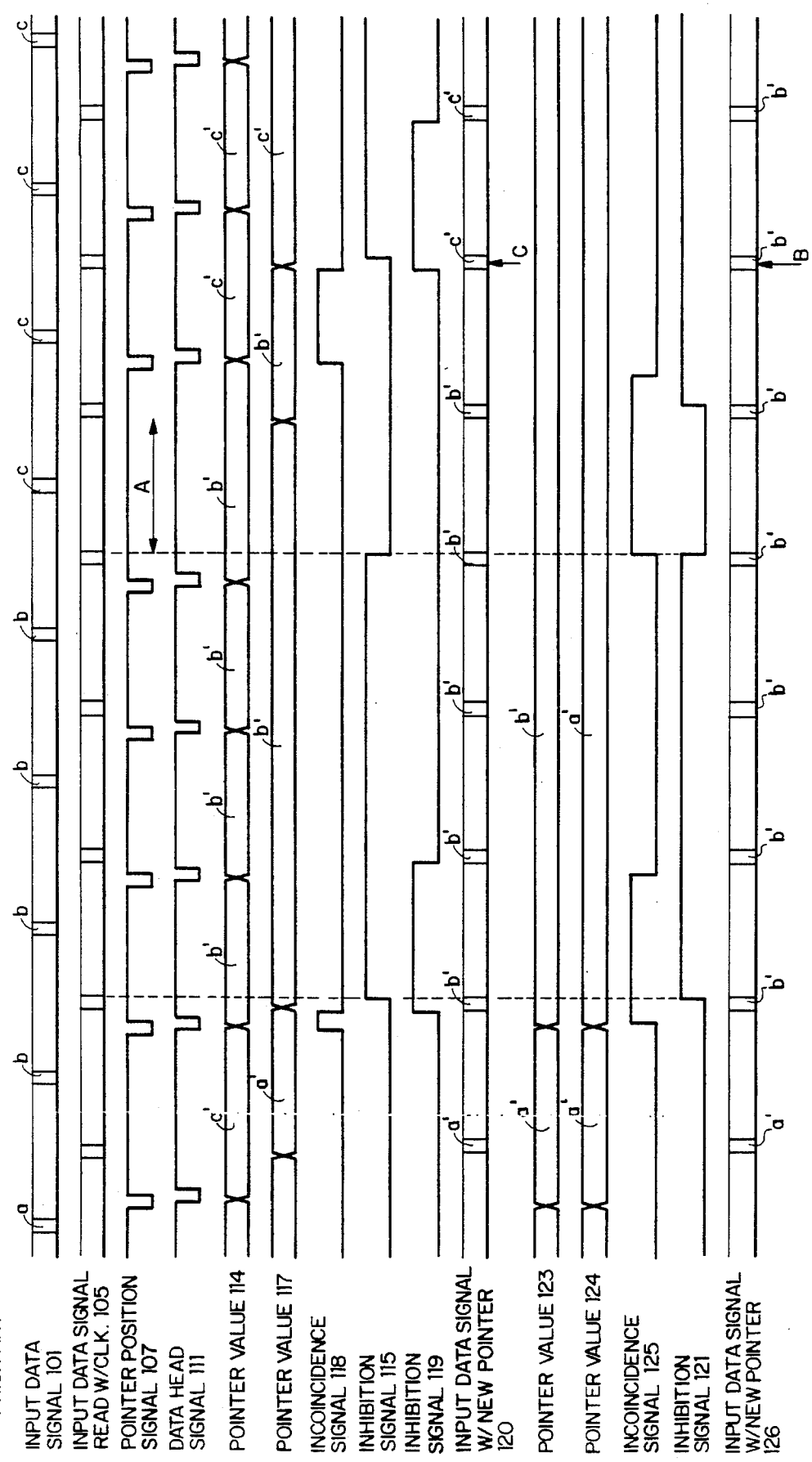
FIG. 3 is a timing chart illustrating operation of the conventional pointer re-setting apparatus shown in FIG. 1.
Figure 4:
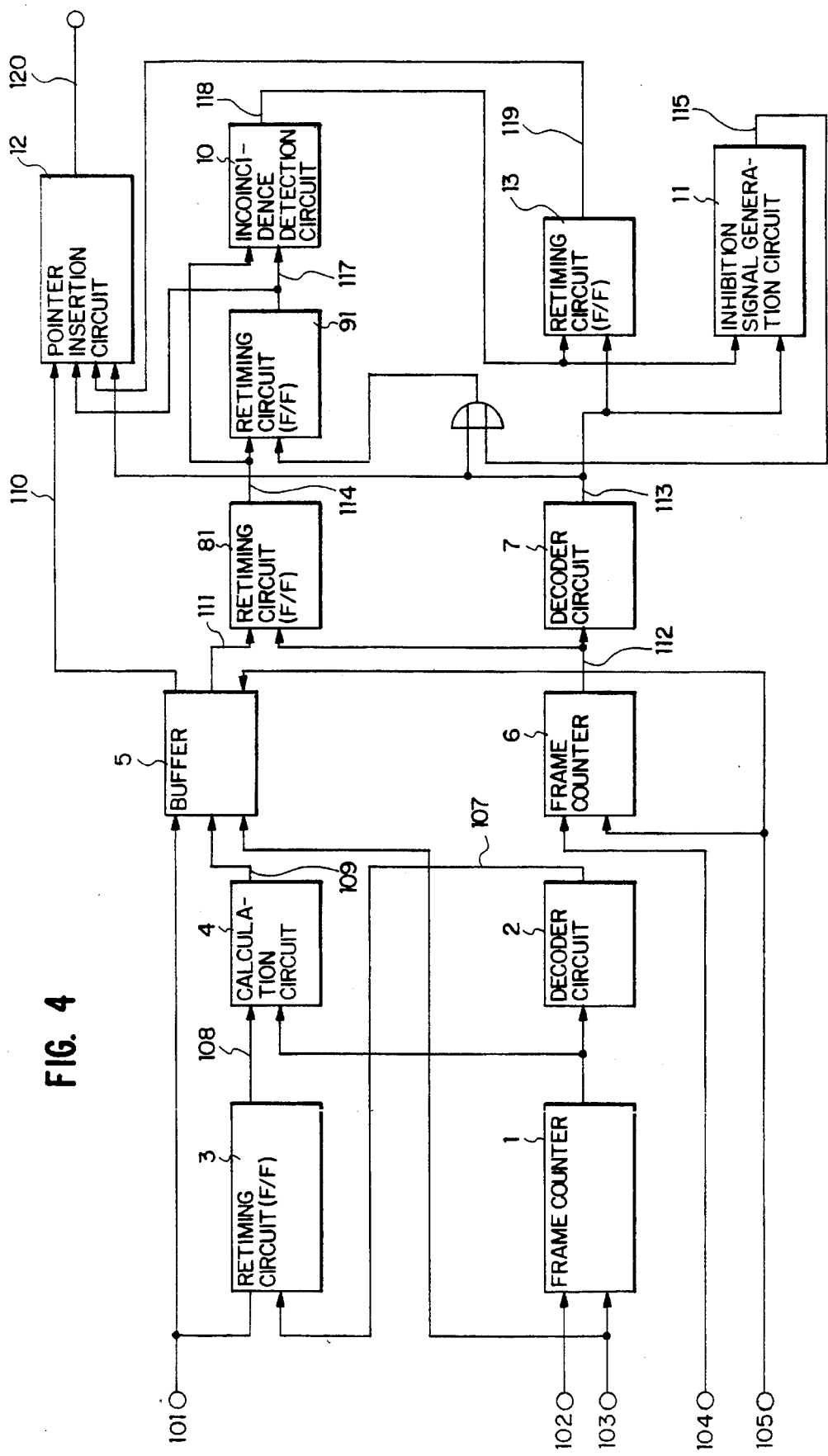
FIG. 4 is a circuit block diagram of an embodiment of a pointer re-setting apparatus of the present invention.
Figure 5:
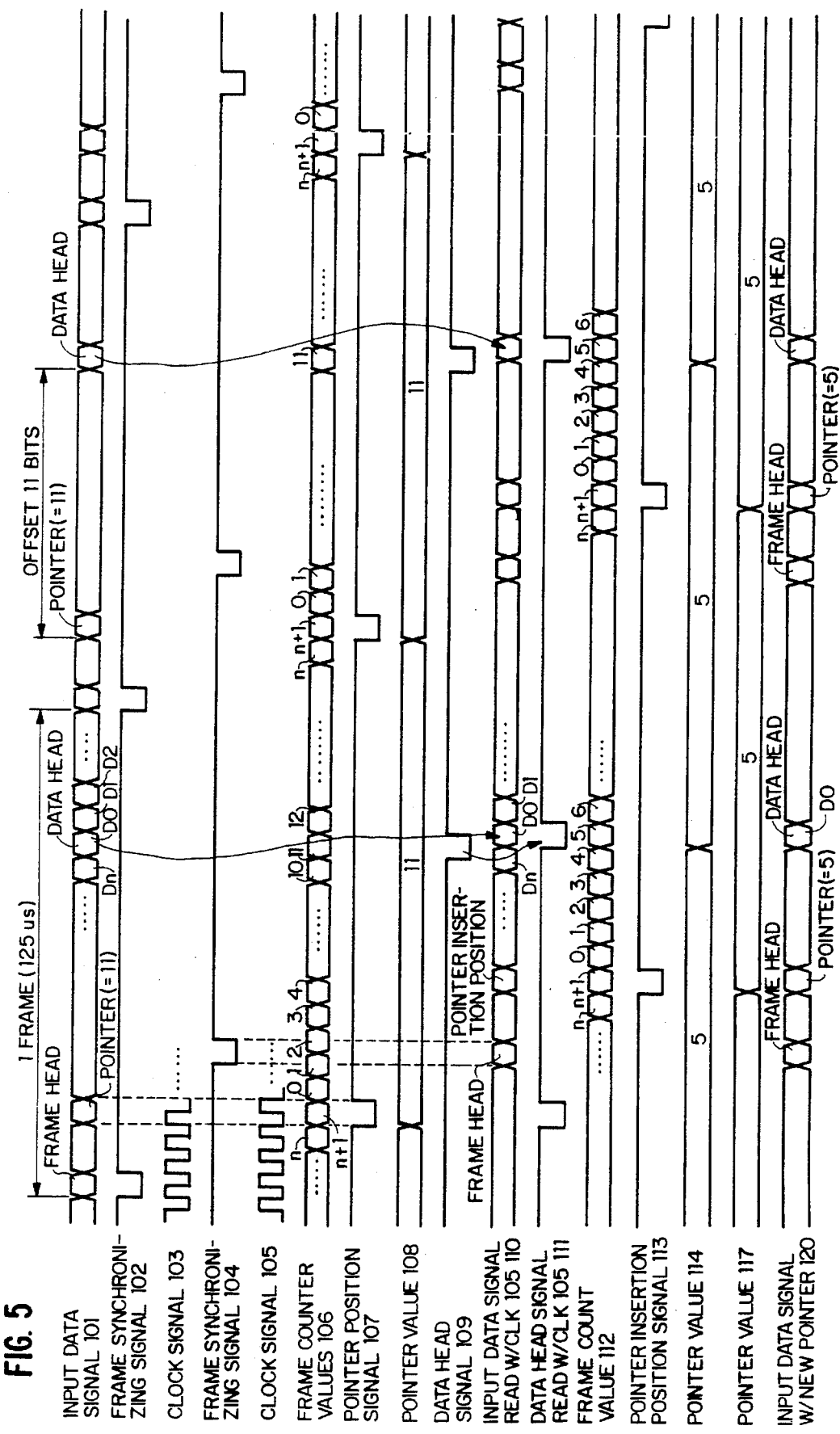
FIG. 5 is a timing chart illustrating operation of the pointer re-setting apparatus shown in FIG. 4.

FIG. 4 is a block diagram of an embodiment of a pointer re-setting apparatus according to the present invention, and FIG. 5 is a timing chart illustrating operation of the pointer re-setting apparatus shown in FIG. 4. The pointer re-setting apparatus includes first frame counter 1 for counting data within an input frame by inputting frame synchronizing signal 102 which indicates the frame head of a frame of input data signal 101 and clock signal 103 and outputting frame count values 106, first decoder circuit 2 for outputting pointer position signal 107 which is indicating a pointer position in the frame of input data signal 101 from the frame count values 106, first retiming circuit 3 for extracting pointer value 108 from frames of input data signal 101 in response to pointer position signal 107, calculation circuit 4 for calculating data head signal 109 which is indicating the position of the data head of the frame from frame count values 106 and pointer value 108, buffer 5 into which input data signal 101 and data head signal 109 are written at the timing of transmission line clock signal 103 and from which the stored input data signal 101 and data head signal 109 are read out with the timing of in-apparatus clock 105 as input frame 110 and data head signal 111, second frame counter 6 for counting data within an in-apparatus frame by inputting the frame synchronizing signal 104 which is indicating the frame head of the in-apparatus frame and in-apparatus clock 105 and outputting in-apparatus frame count values 112, second retiming circuit 81 for latching count values 112 in response to the data head indication pulse signal 111 and outputting the in-apparatus pointer value 114, second decoder circuit 7 for producing pointer insertion position signal 113 indicating the pointer insertion position in the in-apparatus frame from frame count values 112, third retiming circuit 91 for retiming in-apparatus pointer value 114, at the timing of pointer insertion position signal 113 when inhibition signal 115 is not inputted, detection circuit 10 for outputting an incoincidence signal 118 when in-apparatus pointer values 114 and 117 do not coincide with each other, fourth retiming circuit 13 for latching incoincidence detection signal 118 in response to pointer insertion position signal 113, pointer value renewal inhibition signal generation circuit 11 for outputting inhibition signal 115 to inhibit renewal of the pointer value for the period of three frames in response to pointer insertion position signal 113 when incoincidence detection signal 118 is generated from incoincidence detection circuit 10, and pointer value insertion circuit 12 for inserting pointer value 117 into data signal 110 at the timing of pointer insertion position signal 113 when no inhibition signals suppress them.

Operation of the present embodiment is described with reference to the timing chart of FIG. 5.

Frame count value 112, the output of in-apparatus frame counter 6 is retimed with date head indication signal 111 read out from buffer 5 by retiming circuit 81. However, in-apparatus pointer value 114 outputted from retiming circuit 81 is not multiplexed directly with data output signal 110, but a value obtained by retiming in-apparatus pointer value 114 again with pointer insertion position signal 113 by third retiming circuit 91 is multiplexed with input data signal 110 and outputted together as in-apparatus frame 120.

The information on whether the pointer has been renewed or not is detected by the renewed pointer being held in third retiming circuit 91 which compares the outputs of retiming circuits 81 and 91, and second retiming circuit 81 always outputs the latest pointer value so as to allow renewal of the pointer value.

What is claimed is:

1. A pointer re-setting method for an input frame of an inputted time division multiplexed digital signal which is temporarily stored into a buffer and then read out in response to an in-apparatus clock, comprising:

the first counting step of counting data within an input frame from frame synchronizing signal (102) indicating a frame head of the input frame and a clock signal (103) of the transmission line and generating frame count values (106);

the first decoding step of generating, from the frame count value (106), pointer position signal (107) indicating a position of a pointer in the frame of input data signal (101);

the first retiming step of retiming the input data signal 101 with pointer position signal (107) and generating a pointer value 108;

the calculating step of generating data head signal (109) indicating the position of data head of frames from frame count value (106) and pointer value (108);

the buffering step of storing data head signal (109) and input data signal 101 at the timing of clock signal (103) and reading out said stored signals as data head signal (111) and input data signal (110) at the timing of the in-apparatus clock signal (105);

the second frame counting step of counting data within an in-apparatus frame from frame synchronizing signal (104) indicating the frame head of the in-apparatus frame and in-apparatus clock signal (105) and outputting frame count values (112);

the second retiming step of latching the frame count values (112) of in-apparatus frames in response to data head signal (111) and generating in-apparatus pointer value (114);

the second decoding step of generating pointer insertion position signal (113) representing the pointer insertion place in the in-apparatus input frame;

the third retiming step of generating in-apparatus pointer value (117) by retiming pointer value (114) of the in-apparatus frame at the timing of pointer insertion position signal (113) so far as a pointer value renewal inhibition condition is not set particularly;

the step of generating an incoincidence signal (118) when in-apparatus pointer value (114) and (117) do not coincide with each other;

the step of generating inhibition signal (115) in response to pointer insertion position signal (113) to inhibit renewal of the pointer value for the period of three frames when the incoincidence signal (118) is generated, said pointer re-setting method further comprising:

the fourth retiming step of latching the incoincidence signal (118) in response to pointer insertion position signal (113) and generating inhibition signal (119) to inhibit re-setting of the pointer;

the pointer inserting step of inserting in-apparatus frame pointer value (117) into in-apparatus input data signal (110) with the timing of pointer insertion signal (113).

2. A pointer re-setting circuit for an input frame of an inputted time division multiplexed digital signal which is temporarily stored into a buffer and then read out in response to an in-apparatus clock signal comprising:

a first frame counter for counting data within said input frame by inputting frame synchronizing signal (102) indicating a frame head of frame of input data signal (101) and a clock signal (103) of the transmission line and outputting a frame count values (106);

a first decoder circuit for outputting pulse signal (107) indicating a pointer position of frame in the transmission line data signal from said frame count values (106);

a first retiming circuit for retiming the input data signal (101) with pointer position signal (107) which indicates the pointer position and outputting a pointer value (108);

a calculation circuit for outputting data head signal (109) indicating the position of the data head of the frame from the frame count value (106) and pointer value (108);

a buffer into which said input data signal 101 and data head signal (109) are written at the timing of the transmission line clock signal (103) and from which the stored input data signal (101) and pulse signal (109) are read out at the timing of the in-apparatus clock signal (105) as input data signal (110) and data head signal (111) respectively;

a second frame counter for counting data within an in-apparatus frame by inputting the frame synchronizing signal (104) indicating the frame head of the in-apparatus frame and in-apparatus clock signal (105) and outputting a count values (112);

a second decoder circuit for producing pointer insertion position signal (113) which indicates the pointer insertion position in the in-apparatus frame;

a second retiming circuit for latching the pointer value (112) in response to data head signal (111) and outputting in-apparatus pointer value (114);

a third retiming circuit for retiming in-apparatus pointer value (114), at the timing of pointer insertion position signal (113) when a pointer value renewal inhibition signal is not set particularly;

an incoincidence detection circuit for outputting an incoincidence signal when pointer values (114) and (117) which are the output values of said second and third retiming circuits do not coincide with each other;

a pointer value renewal inhibition signal generation circuit for outputting inhibition signal (115) to inhibit renewal of the pointer value for the period of three frames at the timing of said pointer insertion position signal (113) when the incoincidence detection signal (118) is generated from said incoincidence detection circuit, said pointer re-setting apparatus further comprising:

a fourth retiming circuit for latching the incoincidence detection signal (118) in response to pointer insertion position signal (113) and outputting inhibition signal (119); and a pointer insertion circuit for inserting, when a renewal inhibition signal 119 is not received from said fourth retiming circuit, pointer value (117) from said third retiming circuit as a pointer to the in-apparatus frame into data signal (110) at the timing of pointer insertion position signal (113).

\* \* \* \* \*

UNITED STATES PATENT AND TRADEMARK OFFICE
CERTIFICATE OF CORRECTION

PATENT NO. : 5,568,488
DATED : October 22, 1996
INVENTOR(S) : Takayuki Kobayashi It is certified that error appears in the above-indentified patent and that said Letters Patent is hereby corrected as shown below:

Title page,

Delete section [30], the Foreign Application Priority Data.

Signed and Sealed this

Eleventh Day of February, 1997

Attest:

BRUCE LEHMAN

*Attesting Officer*  *Commissioner of Patents and Trademarks*